(12) United States Patent
Singh et al.

(10) Patent No.: US 7,314,404 B2
(45) Date of Patent: Jan. 1, 2008

(54) BURNISHING HEAD

(75) Inventors: Balvinder Singh, Morgan Hill, CA (US); Howard Temple, San Jose, CA (US); Jayadev Patel, deceased, late of San Jose, CA (US); by Rohini Patel, legal representative, San Jose, CA (US); by Ravi Patel, legal representative, Sacramento, CA (US); by Geera Peters, legal representative, Danville, CA (US)

(73) Assignees: Komag, Inc., San Jose, CA (US); Ahead Magnetics, Inc., San Jose, CA (US)

( * ) Notice: Subject to any disclaimer, the term of this patent is extended or adjusted under 35 U.S.C. 154(b) by 0 days.

(21) Appl. No.: 11/399,883

(22) Filed: Apr. 7, 2006

(65) Prior Publication Data

US 2007/0190907 A1     Aug. 16, 2007

Related U.S. Application Data

(60) Provisional application No. 60/773,266, filed on Feb. 14, 2006, provisional application No. 60/773,190, filed on Feb. 13, 2006.

(51) Int. Cl.
*B24B 1/00* (2006.01)

(52) U.S. Cl. .................. 451/63; 451/41; 451/324; 360/235.4; 360/236.4; 360/236.5; 360/236.6; 29/90.01

(58) Field of Classification Search ........... 451/552, 451/312, 319, 324, 41, 63; 29/90.01, 603.12; 360/235.4, 236.4, 236.5, 236.6, 236.7, 237; 73/105

See application file for complete search history.

(56) References Cited

U.S. PATENT DOCUMENTS

| 4,218,715 A | 8/1980 | Garnier ................. 360/103 |
| 4,285,019 A * | 8/1981 | Scott et al. ............. 360/237 |
| 4,553,184 A | 11/1985 | Ogishima ............... 360/103 |
| 4,636,894 A | 1/1987 | Mo ....................... 360/103 |
| 4,646,180 A | 2/1987 | Ohtsubo ................. 360/103 |
| 4,700,248 A | 10/1987 | Coughlin et al. ........ 360/103 |
| 4,802,042 A | 1/1989 | Strom ..................... 360/103 |
| 4,845,816 A | 7/1989 | Nanis ..................... 29/90.1 |
| 4,894,740 A | 1/1990 | Chhabra et al. ........ 360/103 |

(Continued)

FOREIGN PATENT DOCUMENTS

EP    0 458 445 A2    11/1991

(Continued)

OTHER PUBLICATIONS

U.S. Appl. No. 09/251,498, filed by Patel et al. on Feb. 17, 1999.

(Continued)

*Primary Examiner*—Eileen P. Morgan

(57) ABSTRACT

A burnishing head comprises at least two rails, each rail having an inner wall and an outer wall. The outer walls are at an angle relative to one another and relative to a central axis of the burnishing head. This angle permits the burnishing head to exhibit improved recovery time if it contacts a disk being burnished. The rail walls are vertical, and the corner between the rail walls and the top surface of the rails is sharp.

12 Claims, 6 Drawing Sheets

U.S. PATENT DOCUMENTS

| | | | |
|---|---|---|---|
| 4,939,604 A | 7/1990 | Fukuda et al. | 360/103 |
| 4,961,121 A | 10/1990 | Astheimer et al. | 360/103 |
| 4,984,114 A | 1/1991 | Takeuchi et al. | 360/103 |
| 5,062,017 A | 10/1991 | Strom et al. | 360/103 |
| 5,063,712 A | 11/1991 | Hamilton et al. | 451/41 |
| 5,086,360 A | 2/1992 | Smith et al. | 360/103 |
| 5,097,370 A * | 3/1992 | Hsia | 360/236.1 |
| 5,128,822 A | 7/1992 | Chapin et al. | 360/103 |
| 5,166,847 A | 11/1992 | Zak | 360/104 |
| 5,210,666 A | 5/1993 | Chapin et al. | 360/103 |
| 5,285,337 A | 2/1994 | Best et al. | 360/97.02 |
| 5,309,303 A | 5/1994 | Hsia et al. | 360/103 |
| 5,343,343 A | 8/1994 | Chapin | 360/103 |
| 5,404,256 A | 4/1995 | White | 360/103 |
| 5,430,591 A | 7/1995 | Takeuchi et al. | 360/103 |
| 5,508,862 A | 4/1996 | Lazzari et al. | 360/103 |
| 5,550,692 A * | 8/1996 | Crane | 360/236.8 |
| 5,658,191 A * | 8/1997 | Brezoczky | 451/324 |
| 5,782,680 A | 7/1998 | Pilsan | 451/317 |
| 5,825,591 A | 10/1998 | Nakamura et al. | 360/103 |
| 5,831,791 A | 11/1998 | Chhabra | 360/103 |
| 5,850,329 A | 12/1998 | Sullivan | 360/135 |
| 5,870,241 A | 2/1999 | Ottesen et al. | 360/77.02 |
| 5,887,336 A | 3/1999 | Watanabe | 29/603.16 |
| 5,949,614 A | 9/1999 | Chhabra | 360/103 |
| 5,963,396 A | 10/1999 | Burga et al. | 360/103 |
| 5,980,369 A | 11/1999 | Burga et al. | 451/317 |
| 6,138,502 A | 10/2000 | Burga et al. | 73/105 |
| 6,183,349 B1 | 2/2001 | Burga et al. | 451/41 |
| 6,227,042 B1 | 5/2001 | Ruiz | 73/105 |
| 6,262,572 B1 | 7/2001 | Franco et al. | 324/212 |
| 6,272,909 B1 | 8/2001 | Yao et al. | 73/105 |
| 6,273,793 B1 | 8/2001 | Liners et al. | 451/41 |
| 6,497,021 B2 * | 12/2002 | Lee et al. | 29/90.01 |
| 6,503,132 B2 * | 1/2003 | Ekstrum et al. | 451/312 |
| 6,666,076 B2 * | 12/2003 | Lin et al. | 73/105 |
| 6,927,942 B2 * | 8/2005 | Tani et al. | 360/235.6 |
| 2002/0029448 A1 | 3/2002 | Duan et al. | 29/90.1 |
| 2002/0069695 A1 * | 6/2002 | Lin et al. | 73/105 |
| 2005/0185343 A1 * | 8/2005 | Agrawal et al. | 360/237 |
| 2006/0286912 A1 * | 12/2006 | Hu et al. | 451/527 |

FOREIGN PATENT DOCUMENTS

| | | |
|---|---|---|
| EP | 0 576 803 A1 | 1/1994 |
| JP | 2000-242922 | 8/2000 |

OTHER PUBLICATIONS

U.S. Appl. No. 09/458,497, filed by Patel et al. on Dec. 11, 1999.

* cited by examiner

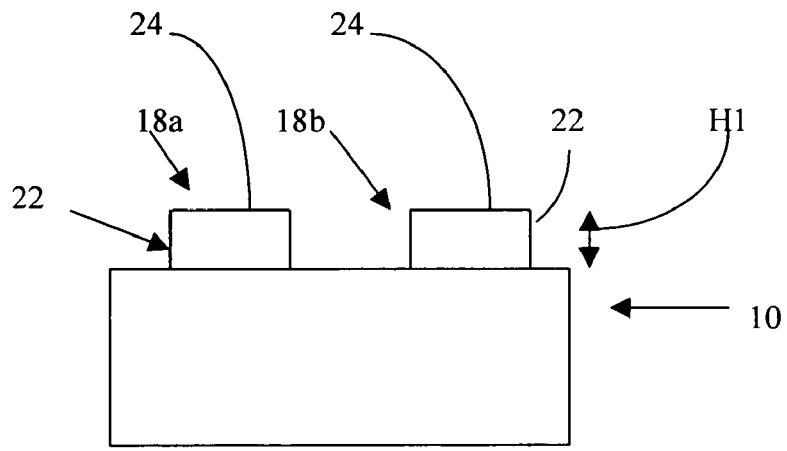
Fig. 2B (Prior Art)
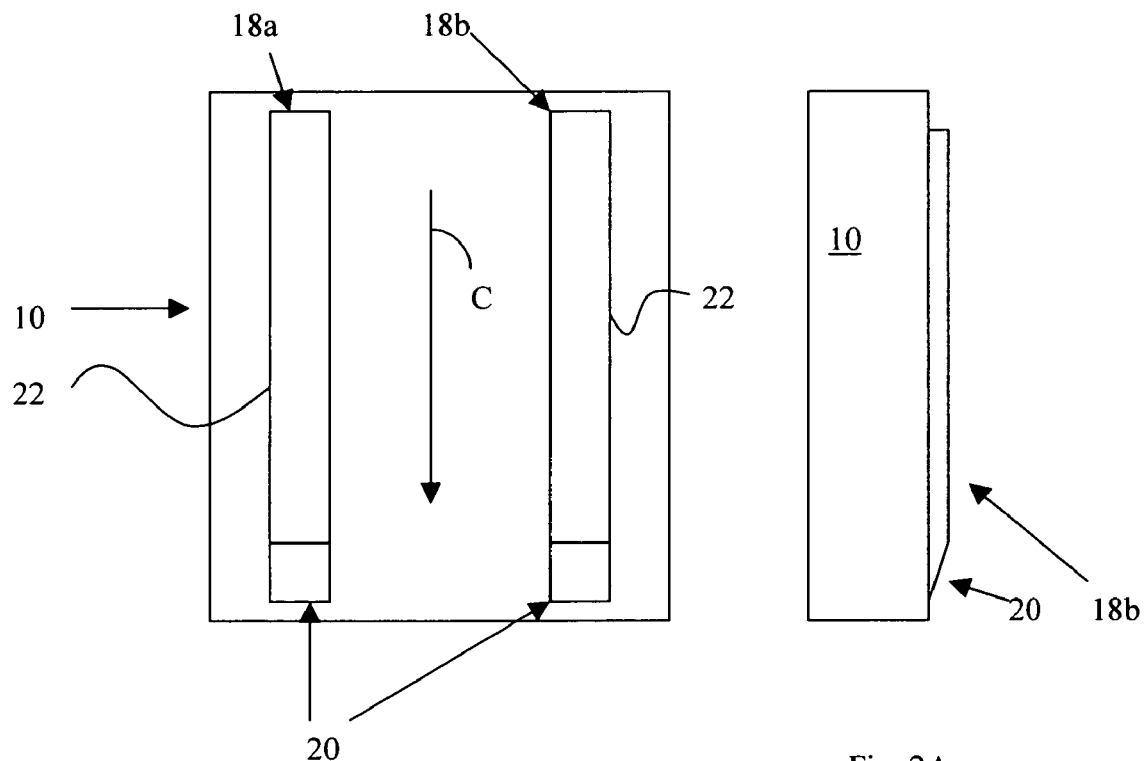
Fig. 2C (Prior Art)
Fig. 2A (Prior Art)

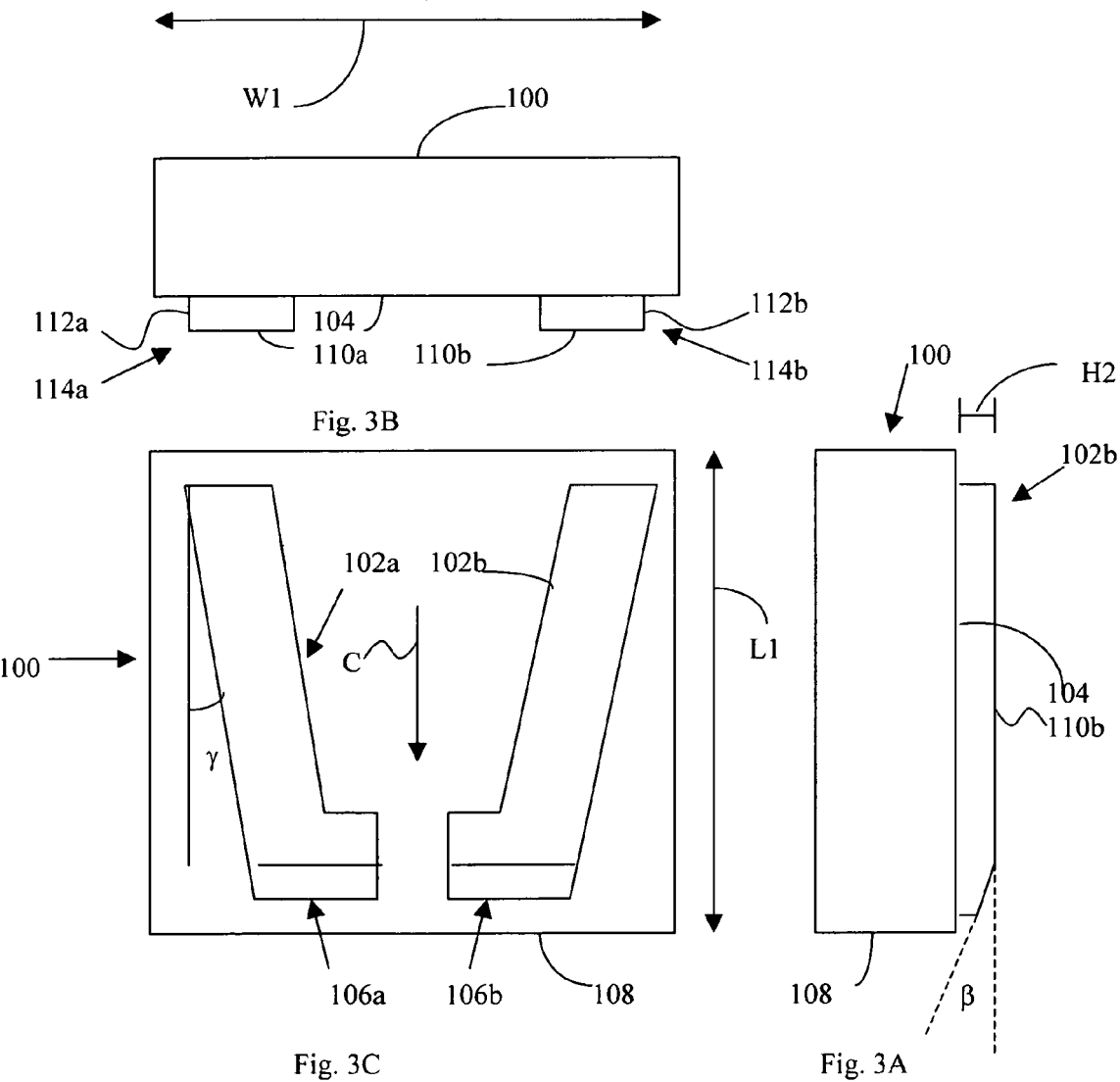

BURNISHING HEAD

This application claims priority based on our U.S. Provisional patent applications 60/773,190 (filed Feb. 13, 2006) and 60/773,266 (filed Feb. 14, 2006), incorporated herein by reference.

BACKGROUND OF THE INVENTION

This invention relates to burnishing heads for burnishing magnetic disks and methods for burnishing magnetic disks.

Magnetic disks are typically manufactured with the following method:
1. An aluminum alloy substrate is electroless plated with a nickel-phosphorus alloy.
2. The plated substrate is textured.
3. One or more underlayers, one or more magnetic layers, and one or more protective overcoats are deposited on the plated, textured substrate. (It is also known to deposit other layers onto the substrate as well.)
4. A lubricant is applied to the protective overcoat.
5. The resulting disk is then burnished.

During burnishing, the disk is rotated, and a burnishing head flies over the disk to remove undesired contaminant particles. Such contaminant particles can comprise $Al_2O_3$ generated during a "kiss-buff" process or an edge buff process. Enhancing particle removal efficiency during burnishing is an important process objective. FIG. 1 illustrates a prior art burnishing head 10 burnishing a magnetic disk 12. Head 10 is held by a suspension 14 while disk 12 rotates in a direction 16. Head 10 is held at an angle α of about 15° relative to the motion of travel of disk 12. During burnishing, head 10 removes contaminant particles from the surface of disk 12.

FIGS. 2A, 2B and 2C illustrate side, rear and bottom views of head 10. As can be seen, head 10 comprises first and second rails 18a, 18b extending from a bottom surface of head 10. Rails 18a, 18b are parallel to a central axis C of head 10, and comprise an inclined portion or ramp 20 that assists head 10 to "fly" above disk 12. Rails 18a, 18b have a height H1 of about 100 μm, and are formed by a mechanical machining process. Rails 18a, 18b have side walls 22 that are substantially vertical with respect to the body of head 10, and have a sharp rail corner. (By rail corner we mean the corner where rail side walls 22 meet rail air bearing surface 24.)

It is also known that burnish heads have been made with etching process. Rails formed by etching have a height of about 5 to 10 μm. (It would take a long time to etch rails of substantially greater height.) Some prior art burnishing heads formed by etching have rounded rail corners and some prior art heads formed by etching have fairly sharp rail corners. Also, some prior art burnishing head rails formed by etching have side walls at an angle, e.g. about 60° with respect to the horizontal, whereas other prior art burnishing head rails formed by etching have side walls close to vertical. However, to the best of our knowledge, the etching process conditions used to form prior art rails that have vertical walls when the rails are only about 10 μm high, would result in sloped walls if used to form rails that were much higher, e.g. 75 μm high.

(Although burnishing head 10 comprises a pair of rails, it is also known in the art to provide burnishing heads having burnishing surfaces such as those shown in U.S. Pat. No. 4,845,816, issued to Nanis, U.S. Pat. No. 6,267,645, issued to Burga, and U.S. Patent Application publication US 2002/0029448A1.)

Burnishing heads differ in structure and function from read-write heads. An example of a read-write head is discussed in U.S. Pat. No. 5,949,614, issued to Chhabra. A read-write head is incorporated into a disk drive. Such a head flies over a magnetic disk during use. A transducer provided at the trailing end of the read-write head reads data from and writes data to the disk. Burnishing heads typically lack such transducers.

Another type of head is used to detect asperities on a magnetic disk surface. Such a head comprises a sensor for sensing mechanical impact of the head against asperities. Burnishing heads typically lack transducers of this type as well. Such heads are discussed in by Burga et al. in U.S. Pat. Nos. 5,963,396 and 6,138,502.

Unfortunately, from time to time, burnishing head 10 may contact disk 10 during burnishing and stay in the avalanche mode. It takes time for head 10 to "recover" from such contact, resume flight over the surface of disk 10, and thereafter resume burnishing disk 10. It would be desirable to reduce the amount of time required for head 10 to recover. Also, the burnishing head 10 shows unstable flying characteristics near the outer edge of the disk 10 since the slider body is not parallel to the direction of the air flow under ABS. This is undesirable for burnishing operation because unstable flying of the head could result in head-disk interaction causing defect generation on the disk. It would be desirable to improve these aspects of burnishing heads.

SUMMARY

A burnishing head in accordance with our invention comprises rails having outer side walls that are at an angle with respect to a central axis of the head. This is desirable for particle removal. Also, since the central axis of the slider is parallel to that of suspension, it takes less time for the head to recover when head-disk interaction occurs due to better flying characteristics.

In one embodiment, the outer walls of the side rails have an angle between 5 and 25° (and typically 15°) with respect to the central axis of the head. It has been demonstrated that this angle prevents contaminant particles from embedding into the disk surface since the particles don't hit the ramp 20 first, but instead hit the edge of the rail which shoves the particles. If the particles come under the ramp 20 while the disk is spinning, the particles can embed into the disk due to vertical force exerted by the ramp. That is why the rails are at an angle between 5 and 25 degrees.

In one embodiment, the burnishing head is held parallel to the direction of the relative motion between the disk and the head.

We have discovered that increasing the height of the burnishing rails compared to prior art burnishing heads enhances performance. The rails typically have a height greater than 30 μm, and in one embodiment, between 50 and 100 μm. It is believed that the higher rail walls permit increased free space and air flow for displaced particles to be ejected from the head/disk interface without being reattached.

We have also discovered that providing rails with side walls close to vertical also enhances burnishing performance. In one embodiment, the side walls are at an angle greater than 75°, and in one embodiment between 80 and 90°. We believe that having steep rail side walls is superior because if the rail walls are not steep, the vertical component of the force applied by the burnishing head to the contaminant particles tends to drive the particles downward into the disk instead of sweeping the particles off of the disk surface.

Also the steep side walls result in a stiffer air bearing due to increased air leakage and results in less compliance to surface abnormalities or particulates.

We have also discovered that ensuring that the any radius of curvature between the rail side walls and the rail air bearing surface is minimized. In one embodiment, this radius of curvature is less than 0.5 mils, e.g. between 0.5 and 0.05 mils, and typically between 0.2 and 0.1 mils. We believe that the reason it is desirable to minimize the radius of curvature is that if a rounded corner hits a particle during burnishing the particle does not receive the full desired impact.

A burnishing head in accordance with one embodiment of our invention comprises AlTiC. However, other hard materials can also be used, e.g. SiC or carbon.

These and other features of a burnishing head in accordance with our invention are described in greater detail below.

BRIEF DESCRIPTION OF THE DRAWINGS

FIG. 2A is a side view of the burnishing head of FIG. 1.

FIG. 2B is a rear view of-the burnishing head of FIG. 2A.

FIG. 2C is a plan view of the bottom of the burnishing head of FIGS. 2A and 2B.

FIG. 3A is a side view of a burnishing head in accordance with the invention.

FIG. 3B is a rear view of the burnishing head of FIG. 3A.

FIG. 3C is a plan view of the bottom of the burnishing head of FIGS. 3A and 3B.

DETAILED DESCRIPTION

Figure 1:
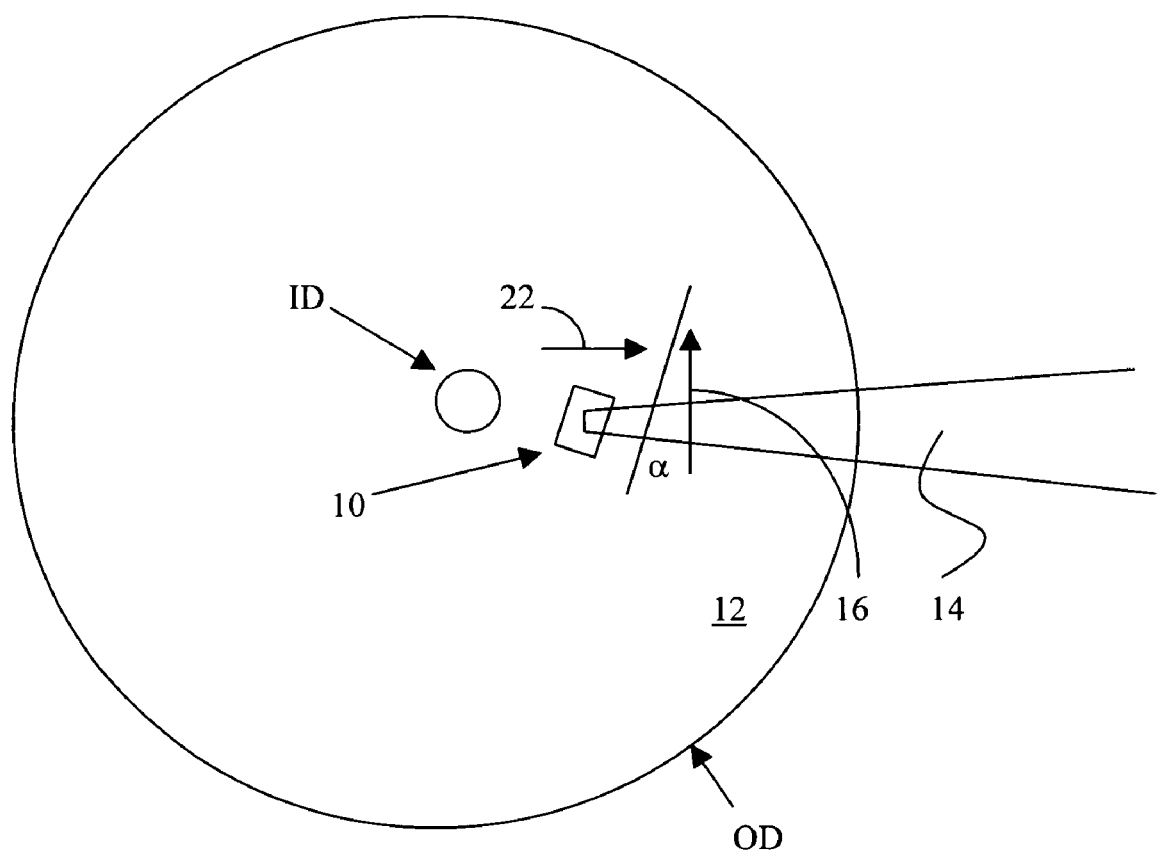
FIG. 1 illustrates prior art burnishing head burnishing a magnetic disk.

FIGS. 3A to 3C illustrate a burnishing head 100 constructed in accordance with our invention. Burnishing head 100 comprises rails 102a, 102b extending from a generally planar bottom surface 104 of head 100. Portions 106a, 106b of rails 102a, 102b, adjacent a leading edge 108 of head 100, are sloped at an angle β for aerodynamic reasons. In one embodiment, angle β is 18 minutes with respect to the rest of the air bearing surfaces 110a, 110b of rails 102a, 102b.

In one exemplary embodiment, rails 102 extend a height H2 between 50 and 100 μm from surface 104. Head 100 has a width W1 of 60 mils and a length L1 of 80 mils. Rails 102a, 102b extend a distance greater than half of length L1, and typically extend length L1 or a distance slightly less than length L1. Outer walls 112a, 112b of rails 102a, 102b form an angle γ of 15° with respect to a central axis C of head 100. These dimensions, however, are merely exemplary.

Burnishing head 100 may be made of any appropriately hard material. For example, in one embodiment, head 100 can comprise AlTiC, SiC or carbon. Alternatively, head 100 can comprise a body of material such as AlTiC and a layer of SiC or carbon deposited thereon, e.g. by sputtering or CVD. (As is known in the art, AlTiC is a two-phase material comprising $Al_2O_3$ and TiC.)

Referring to FIG. 3C, walls 112a, 112b of rails 102a, 102b are close to vertical. Also, corners 114a, 114b where walls 112a, 112b meet surfaces 110a, 110b of rails 102a, 102b are typically sharp 90° angles.

While walls 112a, 112b are illustrated as vertical (and are preferably vertical), walls 112a, 112b can be slightly off vertical, e.g. at an angle greater than 75°. As explained above, the sharpness of corners 114a, 114b and the vertical nature of walls 112a, 112b improve the performance of head 100.

Figure 4:
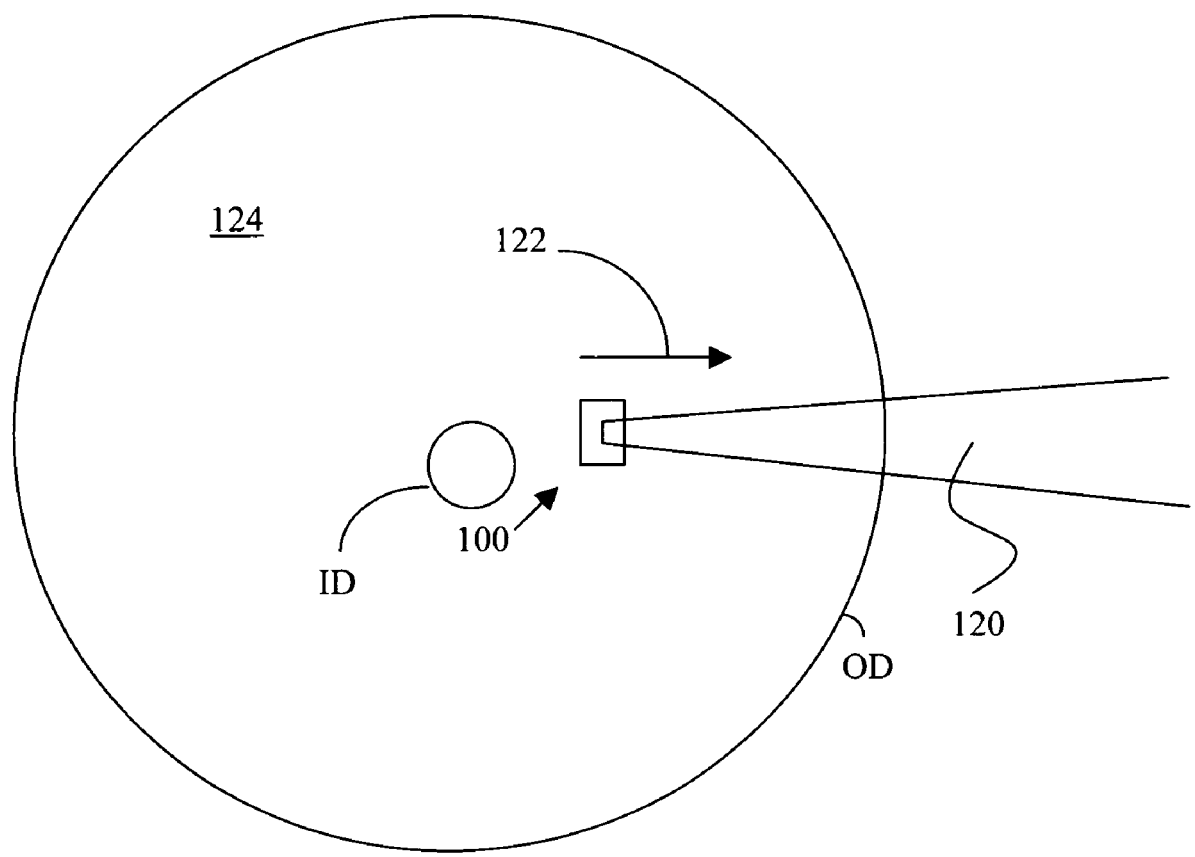
FIG. 4 illustrates the burnishing head of FIGS. 3A to 3C mounted on a suspension and burnishing a magnetic disk.

During use, head 100 is mounted to a suspension 120 as shown in FIG. 4. A first motor (not shown) moves suspension 120 (and therefore head 100) in a direction 122 while a disk 124 being burnished is rotated by a second motor (also not shown). During burnishing, disk 124 moves at a rate of 600 inches per second ("ips") relative to head 100. Head 100 typically flies at about 0.35 microinches above the surface of disk 124. Typically, during burnishing, one starts at the ID of disk 124 and moves the head outwardly. However, in other embodiments, the head can be moved from the OD toward the ID, although this is less desirable, as it would tend to leave contaminant particles at the ID of the disk, and this could conceivably be part of the data recording zone.

In the embodiment of FIG. 4, the central axis C of head 100 is parallel to the direction of motion 128 of disk 124. This is in contrast to the angle α at which head 10 is mounted in FIG. 1.

Figure 5A:
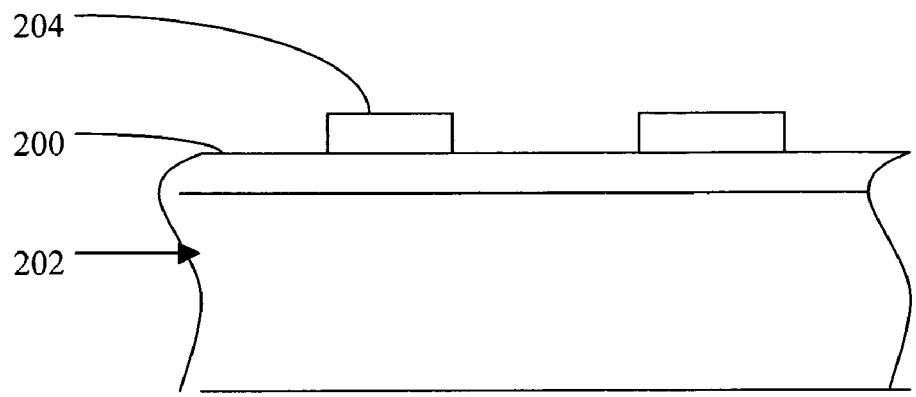
FIGS. 5A and 5B illustrate a method for making a burnishing head.
Figure 5B:
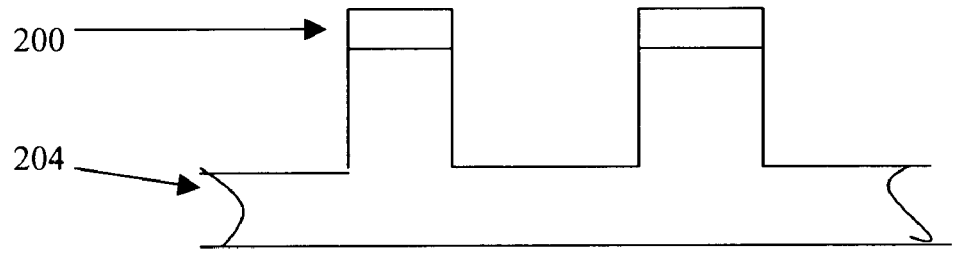

In one embodiment, the rails on the burnishing head are formed by etching, e.g. using the following process:

1. As shown in FIG. 5A, a copper layer 200 is deposited, e.g. by sputtering, on a body of material 202. (Body 202 is typically AlTiC.)
2. A photoresist layer 204 is formed on copper layer 200.
3. Photoresist layer 204 is lithographically patterned. (In lieu of lithographic patterning, in some embodiments e-beam patterning is used.) (FIGS. 5A and 5B only show a small portion of body of material 202. Typically, many burnishing heads are formed in body 202 simultaneously.)
4. The resulting structure is subjected to an etching step using an aqueous ferric chloride ($FeCl_3$) solution to thereby transfer the pattern in photoresist layer 204 to copper layer 200. The remaining portion of photoresist layer 204 is then removed, e.g. with acetone.
5. Referring to FIG. 5B, the resulting structure is then subjected to a RIE process using a mixture of fluorine and argon as the process gas. In one embodiment, the source of fluorine is $SF_6$, but in other embodiments, other fluorine-containing gasses can be used. Also, in one embodiment, 20 SCCM $SF_6$ and 15 SCCM of argon flow into the etching apparatus. The etching process continues until etching is performed to a depth from 30 to 100 μm, and in one embodiment, between 65 and 100 μm.
6. Thereafter, the remaining portion of copper layer 202 is removed using an aqueous ferric chloride solution.
7. Body of material 202 is then cut into individual burnishing heads.
8. Portions 106a and 106b are mechanically formed on the heads.

Further details concerning the above-mentioned process are described in U.S. Provisional Patent Application 60/773,225, filed on Feb. 13, 2006 by Simone Guerrier, entitled "Method for Etching a Workpiece", incorporated herein by reference. This process is merely exemplary. In other embodiments, other process can be used.

Figure 6B:
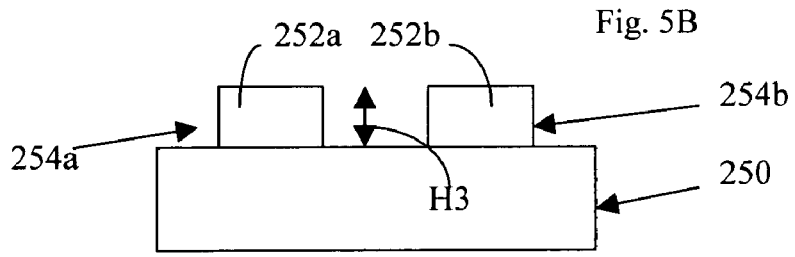
FIG. 6B is a rear view of the burnishing head of FIG. 6A.
Figure 6A:
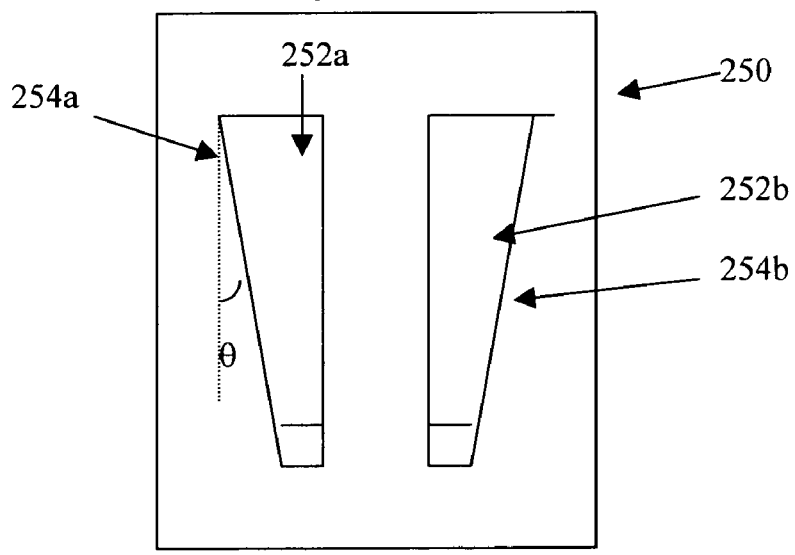
FIG. 6A is a bottom view of a burnishing head constructed in accordance with another embodiment of the invention.

FIG. 6A illustrates a burnishing head 250 constructed in accordance with an alternative embodiment of our invention. Burnishing head 250 comprises trapezoidal rails 252a and 252b. As can be seen, outer walls 254a, 254b of rails 252a, 252b are at an angle θ with respect to the central axis C of head 250. Angle θ is between 5 and 25°, and typically about 15°.

FIG. 6B is a rear view of head 250. As in the embodiment of FIG. 3, rails 252a, 252b have a height H3 between 30 and 100 μm, and in one embodiment, 65 μm. The walls of rails 252a, 252b form an angle close to the vertical, e.g. greater than 75° and in one embodiment, between 80 and 90°.

In the above-described embodiments, both the outer rail walls are at an angle θ with respect to the head's central axis C. It is primarily important for the rail wall closest to the OD (for the case in which the burnishing head is moved from the ID to the OD) to be at angle θ. The opposite wall of the opposite rail is typically at this angle for reasons of symmetry and flying stability. (For the case in which the burnishing head is moved from the OD toward the ID, the angle of the rail wall closest to the ID is of primary importance.)

Figure 7:
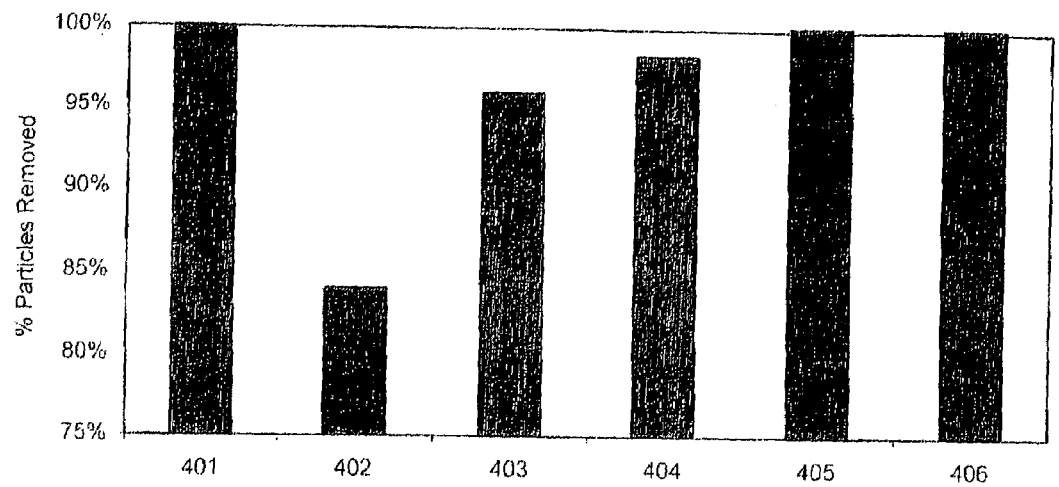
FIG. 7 is a table comparing flying performance of burnishing heads in accordance with the invention and burnishing heads in accordance with the prior art.

As mentioned above, one of the major advantages of a head in accordance with the invention is an improvement in flyability, e.g. as shown in FIG. 7. In FIG. 7 an experiment was performed in which burnishing heads were moved toward a disk OD during burnishing. The disk radius was 1.87 inches. Heads 351, 352 and 353 were prior burnishing heads as shown in FIGS. 1 and 2. As can be seen in FIG. 7, on the average, heads of this design could only reach about 1.855 inches before the onset of avalanching. (Avalanching occurs when the head stops flying and drags on the disk.) After avalanching, heads 351, 352 and 353 were pulled back toward the disk ID. As can be seen, heads 351, 352 and 353 did not recover and begin flying again until they were on an average radius of 1.808 inches.

In contrast, heads 301, 302 and 303 (in accordance with the design of FIGS. 6A and 6b) achieved superior performance. In particular, they did not begin avalanching until they reached a radius (on average) of 1.868 inches, and they recovered at an average radius of 1.859 inches. Thus, heads of this design exhibited superior flying performance.

Figure 8:
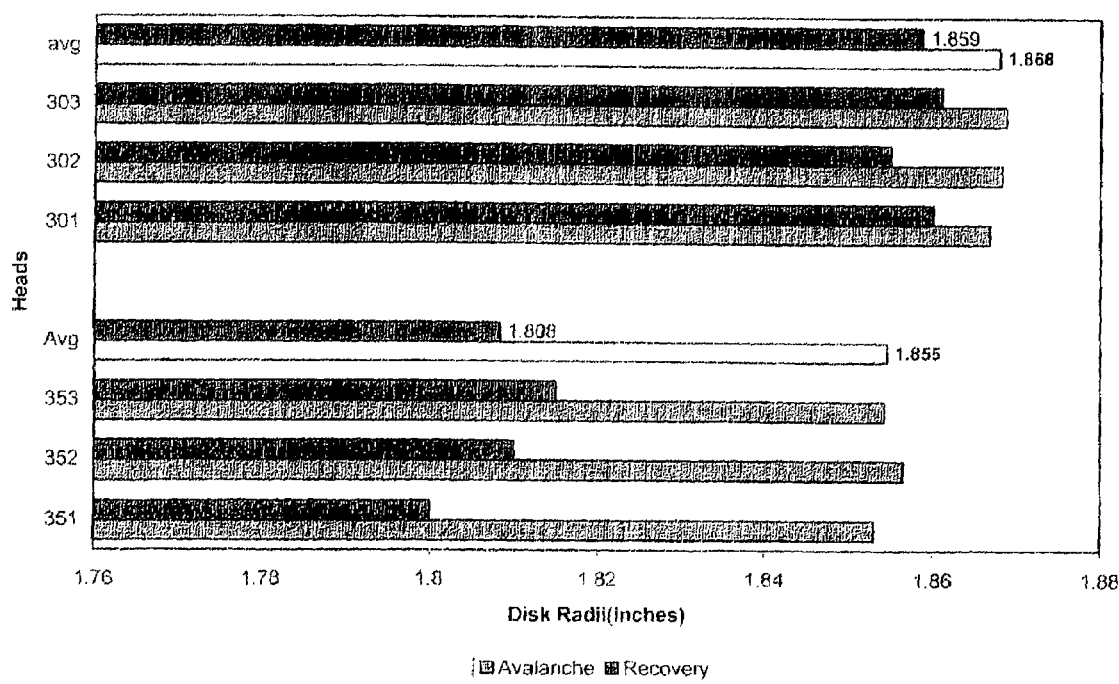
FIG. 8 is a table comparing burnishing performance of burnishing heads having various characteristics.

Although heads in accordance with the design of FIGS. 6A and 6B exhibited superior flying performance, it is also necessary for burnishing heads to exhibit good particle removal during burnishing. Heads having the FIGS. 6A and 6B design are not easily formed by machining. We experimented with etching techniques to determine whether such heads could be formed by etching. FIG. 8 is a table illustrating the results achieved during experiments with burnishing heads 401 to 406, each having selected characteristics as discussed below. Burnishing head 401 was a prior art burnishing head as shown in FIGS. 1 and 2 formed by machining. The rails for head 401 had a height of 100 μm. During the experiments, a disk was examined with optical inspection apparatus to determine the number of contaminant particles thereon, dipped in lubricant which contained additional $Al_2O_3$ contaminant particles, and examined again to get a new count of contaminant particles. The disk was then burnished with a burnishing head. During burnishing, the head swept from the ID to the OD and then back to the ID. The disk was then examined again with the above-mentioned apparatus to determine how many contaminant particles were removed.

Head 401 eliminated a number of contaminant particles equal to the number of particles added to the disk when it was dipped in lubricant, i.e. the number of contaminant particles removed equals 100% of the number of particles added during dipping. (During this experiment, the particles removed during burnishing were not necessarily all the exact same particles placed on the disk due to dipping. However, the number of particles removed during burnishing was the same as the number of particles placed on the disk due to dipping.)

Head 402 was similar to head 401, except a) head 402 was made by etching, b) the rail height for head 402 was 10 μm, c) the rail walls were at 60°, and d) the radius of curvature at the corner of the rails for head 402 were larger (e.g. a couple of mils) than for head 401 (which had sharp corners). As can be seen, head 402 yielded poor burnishing performance, removing a number of particles equal to only 84.1% of the particles that were added during the lubricant dip.

Head 403 was the same as head 402, except that the rail height was 75 μm instead of 10 μm. As can be seen, this caused the particle removal efficiency to rise to 96.0%.

Head 404 was the same as head 403, except the rail corners were much sharper in head 404. This design change caused the particle removal efficiency to rise to 98.4%.

Head 405 was the same as head 404, except that the rail walls were vertical. This caused the particle removal efficiency to rise to 102.0%. (This efficiency was possible because this head removed not only a number of particles equal to what was added when the disk was dipped in the contaminant particle-containing lubricant, but also contaminant particles present on the disk before dipping.)

Head 406 was of the design in accordance with FIGS. 6A and 6B. Head 406 had a rail height of 75 μm, vertical walls and sharp corners. As can be seen, head 406 exhibited a particle removal efficiency of 101.0%

The above-mentioned experiments show that one can form a burnishing head that achieves both good burnishing performance and good flyability.

While the invention has been described with respect to a specific embodiment, those skilled in the art will appreciate that changes can be made in form and detail without departing form the spirit and scope of the invention. For example, the burnishing head can be made using different manufacturing techniques, have different mechanical dimensions, and be made from different materials. A burnishing head in accordance with our invention need not have all the characteristics, and meet all of the objectives set forth above. Also, one can rotate a disk at different velocities during burnishing. Accordingly, all such changes come within the invention.

We claim:

1. A burnishing head comprising:

a body of material having a leading edge and a trailing edge;

first and second rails extending from a surface of said body of material, said first and second rails comprising inner and outer walls, said outer wall of said first rail being at an angle with respect to a central axis of said burnishing head such that the portion of said outer wall of said first rail closest to the leading edge is closer to the central axis than the portion of said outer wall of said first rail closest to the trailing edge, said outer wall of said second rail being at an angle with respect to the central axis such that the portion of said outer wall of said second rail closest to the leading edge is closer to the central axis than the portion of said outer wall of said second rail closest to the trailing edge, wherein the height of the rails is greater than 30 μm, at least one wall of at least one rail forms an angle between 75 and 90° with respect to a plane of said surface of said body of material as measured from said plane, through said rail, to said wall, and the radius of curvature between said outer walls of said first and second rails and a burnishing surface of said first and second rails is less than 0.5 mils.

2. Burnishing head of claim 1 wherein the angles between said outer walls and the central axis are each between about 5 to 25 degrees.

3. Burnishing head of claim 1 wherein the first and second rails are symmetrical with respect to said central axis to thereby enhance flyability of said burnishing head.

4. A burnishing head comprising:
a body of material having a leading edge and a trailing edge;
first and second rails extending from said body of material, said first and second rails comprising inner and outer walls, said outer wall of said first rail being at an angle with respect to a central axis of said burnishing head such that the portion of said outer wall of said first rail closest to the leading edged is closer to the central axis than the portion of said outer wall of said first rail closest to the trailing edge, said outer wall of said second rail being at an angle with respect to the central axis such that the portion of said outer wall of said second rail closest to the leading edge is closer to the central axis than the portion of said outer wall of said second rail closest to the trailing edge, wherein the height of the rails is greater than 30 μm, and the radius of curvature between said outer walls of said first and second rails and a burnishing surface of said first and second rails is less than 0.5 mils.

5. A method for burnishing a magnetic disk comprising:
rotating said magnetic disk; and
flying a burnishing head over said magnetic disk, said burnishing head comprising a body of material and first and second rails extending from a surface of said body of material, said burnishing head having a leading edge and a trailing edge, said first and second rails comprising inner and outer walls, said outer wall of said first rail being at an angle with respect to a central axis of said burnishing head such that the portion of said outer wall of said first rail closest to the leading edge is closer to the central axis than the portion of said outer wall of said first rail closest to the trailing edge, said outer wall of said second rail being at an angle with respect to the central axis such that the portion of said outer wall of said second rail closest to the leading edge is closer to the central axis than the portion of said outer wall of said second rail closest to the trailing edge, wherein the height of the rails is greater than 30 μm, at least one wall of at least one rail forms an angle between 75 and 90° with respect to a plane of said surface as measured from said plane through said rail to said at least one wall, and the radius of curvature between said outer walls of said first and second rails and a burnishing surface of said first and second rails is less than 0.5 mils.

6. Method of claim 5 wherein the angles between the outer walls and the central axis are each between 5 and 25°.

7. Method of claim 5 wherein the first and second rails are symmetrical with respect to said central axis to thereby enhance flyability of said burnishing head.

8. A method for burnishing a magnetic disk comprising:
rotating said magnetic disk; and
flying a burnishing head over said magnetic disk, said burnishing head comprising a body of material and first and second rails extending from said body of material, said burnishing head having a leading edge and a trailing edge, said first and second rails comprising inner and outer walls, said outer wall of said first rail being at an angle with respect to a central axis of said burnishing head such that the portion of said outer wall of said first rail closest to the leading edge is closer to the central axis than the portion of said outer wall of said first rail closest to the trailing edge, said outer wall of said second rail being at an angle with respect to the central axis such that the portion of said outer wall of said second rail closest to the leading edge is closer to the central axis than the portion of said outer wall of said second rail closest to the trailing edge, wherein said rails have a height greater than 30 μm, and the radius of curvature between said outer walls of said first and second rails and a burnishing surface of said first and second rails is less than 0.5 mils.

9. A burnishing head comprising:
a body of material; and
first and second rails extending from a surface of said body of material by a distance greater than 30 μm, said first and second rails comprising inner and outer walls, at least one of said outer walls being at an angle with respect to a center axis of said burnishing head, wherein said at least one of said outer walls forms an angle between 75 and 90° with respect to a plane of said surface of said body of material as measured from said plane, through said rail to said outer walls, and the radius of curvature between said outer walls of said first and second rails and a burnishing surface of said first and second rails is less than 0.5 mils.

10. A method for burnishing a magnetic disk comprising:
rotating said magnetic disk; and
flying a burnishing head over said magnetic disk, said burnishing head comprising a body of material and first and second rails extending from a surface of said body of material by a distance greater than 30 μm, said first and second rails comprising inner and outer walls, at least one of said outer walls being at an angle with respect to a central axis of said burnishing head, wherein said at least one outer wall of said first and second rails form an angle between 75 and 90° with respect to a plane of said surface of said body of material as measured from said plane, through said rails to said outer wall, and the radius of curvature between said outer walls of said first and second rails and a burnishing surface of said first and second rails is less than 0.5 mils.

11. Burnishing head of claim 1, 4 or 9 wherein said body of material comprises AlTiC.

12. Method of claim 5, 8 or 10 wherein said body of material comprises AlTiC.

* * * * *